United States Patent
Waters

[11] 3,735,031
[45] May 22, 1973

[54] THREE-DIMENSIONAL IMAGE DISPLAY SYSTEM

[75] Inventor: James P. Waters, Rockville, Conn.

[73] Assignee: United Aircraft Corporation, East Hartford, Conn.

[22] Filed: Sept. 14, 1971

[21] Appl. No.: 180,294

[52] U.S. Cl. ............178/6.5, 178/6.6 TP, 346/74 TP, 350/3.5
[51] Int. Cl. ..............................H04n 5/82, H04n 9/54
[58] Field of Search ..........................178/6.5, 6.6 TP, 178/7.87, 7.5 D; 350/3.5; 346/77 E, 74 TP

[56] References Cited

UNITED STATES PATENTS

| | | | |
|---|---|---|---|
| 3,514,535 | 5/1970 | Steiner et al. | 178/7.87 |
| 3,560,205 | 2/1971 | Urbach | 350/3.5 |
| 3,400,382 | 9/1968 | Korzweil | 178/6.6 TP |
| 3,175,196 | 3/1965 | Lee et al. | 346/77 E |
| 3,239,602 | 3/1966 | Lemelson | 178/6.6 TP |
| 3,671,096 | 6/1972 | Mackin | 350/3.5 |
| 3,662,397 | 5/1972 | Ballinger | 178/6.6 TP |

*Primary Examiner*—Richard Murray
*Assistant Examiner*—Joseph A. Orsino, Jr.
*Attorney*—Donald F. Bradley

[57] ABSTRACT

A system for producing a three-dimensional image comprises scanning a deformable thermoplastic material with electrons in accordance with desired holographic information, deforming the thermoplastic material with heat, and illuminating the thermoplastic with monochromatic light. In another embodiment holographic information is impressed by use of coherent IR radiation on the thermoplastic on which a constant spatial charge has been impressed by an electron gun to form a hologram which is then displayed by a visible monochromatic light source.

1 Claim, 2 Drawing Figures

THREE-DIMENSIONAL IMAGE DISPLAY SYSTEM

BACKGROUND OF THE INVENTION

1. Field of the Invention

This invention relates invntion the production of three-dimensional images by forming a hologram of the desired image on a thermoplastic material within an electron tube. After processing the material, the hologram may be illuminated with monochromatic light to produce the image. Both experimental holograms of existing objects and synthetic holograms or kinoforms derived by computers may be produced.

2. Description of the Prior Art

One of the current short-comings of true, three-dimensional image display systems by holographic techniques is the long time delay between the generation of analytical, holographic data and the reconstruction of an image for visual presentation. Photographic techniques for producing holograms require lengthy processing procedures. Synthetic holograms require plotting the hologram in some manner and photoreducing the plot. In each case, the image cannot be produced until several intermediate steps are performed, all of which require time and/or specialized techniques.

The present invention overcomes the disadvantages of the prior art and enables a three-dimensional image to be produced immediately upon forming of the hologram. Specifically, this invention describes equipment and techniques for the rapid construction and observation of synthetic holograms or kinoforms generated by computers, or experimental holograms which have been encoded on the electron beam.

The holograms of the present invention are produced on a flat thermoplastic material within an electron tube. In one embodiment the surface of the thermoplastic is scanned by an electron beam which places a charge on each incremental portion of the thermoplastic material as a function of the desired holographic or kinoform information. When the thermoplastic is heated to its melting point, its thickness varies according to the charge distribution. Illumination of the thermoplastic by a monochromatic light beam will produce the three-dimensional image as a conventional hologram or kinoform.

In another embodiment the thermoplastic material receives an equal charge from the electron beam and the thermoplastic is selectively heated to produce the desired deformation by means of a holographic information in the infrared region.

The process can be repeated rapidly since the original holographic or kinoform image is easily erased by heating the thermoplastic material well above its melting point.

A device in which a thermoplastic material in an electron tube is subjected to deformation by an electron beam in response to a desired information pattern is disclosed in U. S. Pat. No. 2,919,302, but the teaching of this prior art patent is restricted to producing a two-dimensional image of color televison pictures. The present invention uses similar apparatus, but produces a hologram or kinoform from which three-dimensional images are produced.

SUMMARY OF THE INVENTION

In one embodiment of the present invention, the electron gun which scans the thermoplastic material is controlled in response to input information which may be coded information from an experimental hologram or which may be hologram or kinoform information generated by a computer. The electron charge placed on each incremental portion of the thermoplastic material as it is scanned will determine the deformation of the thermoplastic when heated, and thus control the thickness of the thermoplastic so that the desired phase hologram is produced.

In another embodiment of the present invention, the charge placed on the thermoplastic material is equal for each increment, and the thermoplastic is selectively heated to produce the desired deformation. One method of heating is by imaging the desired holographic information produced by infrared light on the thermoplastic. Thus, only those portions of the thermoplastic on which the information occurs will be deformed.

DESCRIPTION OF THE PREFERRED EMBODIMENT

Figure 1:
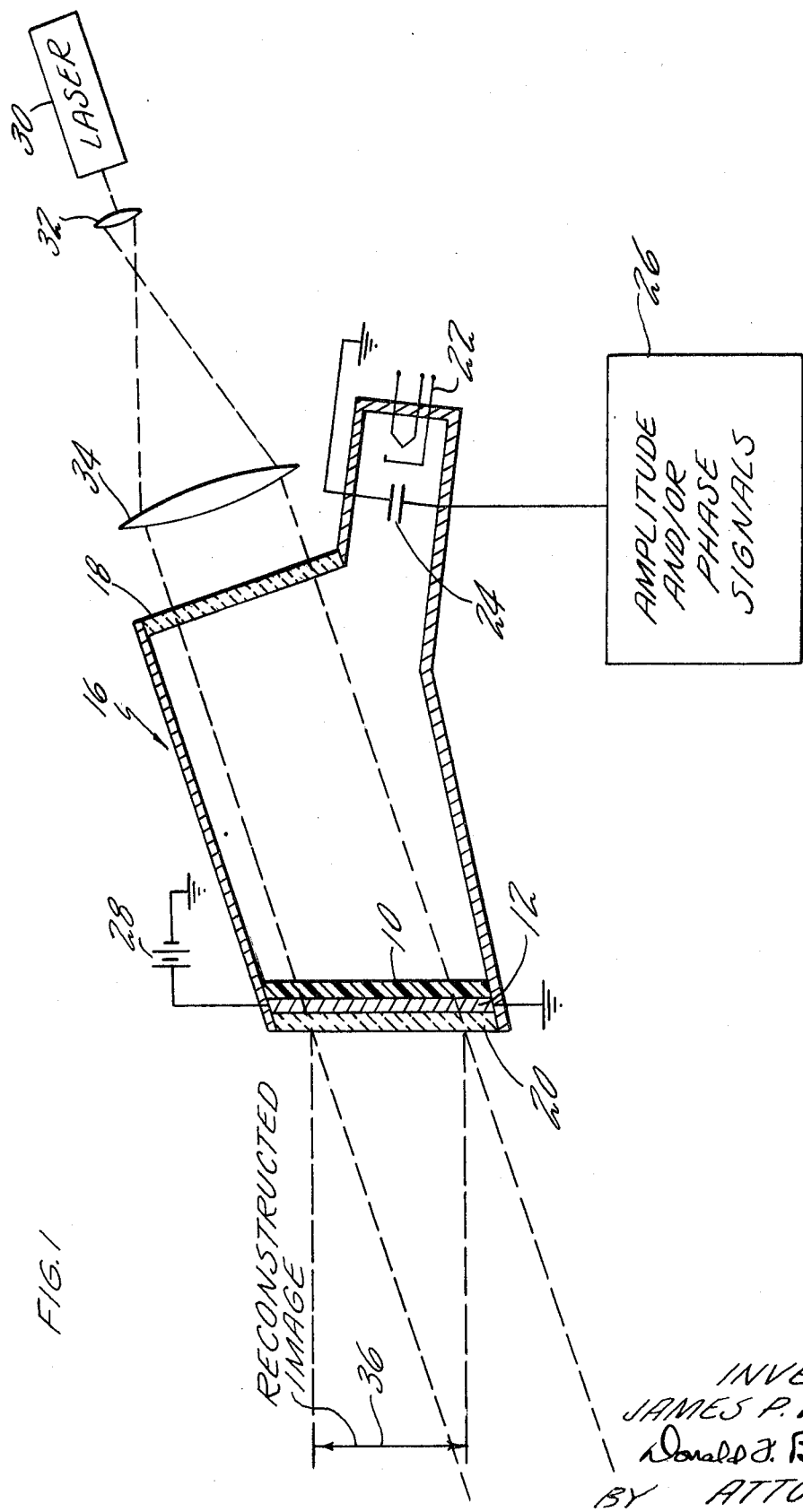
FIG. 1 shows schematically a three-dimensional imaging system in which a hologram is produced on a thermoplastic material by an electron gun.

In FIG. 1 there is shown a preferred apparatus for practicing the present invention. The medium on which the hologram is impressed is preferably a thermoplastic material 10 which is coated on a transparent conducting electrode 12 and a transparent support of suitable material such as glass which may comprise the face of a cathode ray or electron tube as will be described. Thermoplastic materials are well known in the art, and any transparent material capable of holding a space charge which may be easily deformed by heat to cause a sufficient variation in its thickness may be used. Specific thermoplastic materials capable of use in the present invention and the resolution capabilities thereof are described in Applied Optics, Vol. 5, No. 4, Apr. 1966, at page 666; Journal of Applied Physics, Vol. 16, No. 5, May 1965, at page 1613; and Applied Optics, Vol. 9, No. 9, Sept. 1970, at page 2090.

For example, a thermoplastic of "Staybelite" may be applied to the conducting electrode 12 with a thickness of approximately $1 \times 10^{-4}$ cm. depending on the spatial frequency desired. The conducting electrode 12 may be a very thin coating of gold and silver.

The thermoplastic material 10 and the conducting electrode 12 are incorporated into a cathode ray or electron beam tube 16 which has, in addition to an electron gun, light transmitting windows 18 and 20. Window 20 forms the transparent support for the thermoplastic material. Construction of the tube 16 is well known in the art. A source of electrons is provided in the form of a heated cathode 22. While not shown in the figure, there must also be provided an anode and electromagnetic sweep coils with a source of potential. Shown at 24 is a pair of electrostatic deflection plates connected to electronics shown at block 26 capable of applying a source of voltage on the deflection plates 24 proportional to either the amplitude or phase of the holographic information. Deflection plates 24 are used to velocity modulate the electron beam as it scans the thermoplastic medium in response to the information contained in block 26. Each incremental point of the thermoplastic material 10 will receive a number of electrons or charge directly proprotional to the information contained in block 26. This information may be that to produce a synthetic hologram or a kinoform by means of computer information, or may be the information necessary to produce a hologram from an experimental arrangement, the infor-mation signals being coded to produce the proper charge in the thermoplastic material 10.

The information from block 26 is thus used to modulate the electron beam as it is scanned over the thermoplastic material in a raster similar to a television display system. This results in a spatial charge distribution which is directly related to the irradiance distribution found on a conventional hologram.

Once the charge has been impressed on the thermoplastic material 10, the thermoplastic is heated. Any well known means of heating the thermoplastic may be used such as a heat lamp, RF field, or as shown, a battery 28 connected to the transparent conducting electrode 12.

Upon heating the thermoplastic to its melting point in the presence of the electric fields produced by the electron charge distribution, the thickness of the thermoplastic film 10 varies according to the charge distribution. This results in either a phase hologram or kinoform which, when illuminated by a monochromatic light source, will reconstruct the original image where it can be observed in true three-dimensional form.

The monochromatic light source is shown as laser 30 whose output passes through objective lens 32 and collimating lens 34 where the light beam is collimated. The collimated light beam then passes through window 18 to impinge on the thermoplastic material 10. The light beam is diffracted and an off axis reconstructed image of the hologram is produced at 36.

By heating the thermoplastic film 10 well above its melting point, the conductivity of the surface will increase and the surface tension will smooth out the deformation. The process can then be repeated in order to display any number of three-dimensional objects. The rapid writing speed of the electron beam, the relatively short development time of the thermoplastic material 10 (about 0.01 sec.), and the combination of all components in a single system permit the construction of the hologram and its observation to be completed in times which approach a real time display.

Recent developments in holographic synthesis by analytic techniques provide one method for generating the required information as shown in block 26. Such developments are described in Applied Physics Letters, Vol. 9, No. 11, Dec. 1, 1966 and Journal of the Optical Society of America, Vol. 58, No. 9, Sept. 1, 1968. Application of the described techniques in holographic synthesis will provide a working system for a three-dimensional visual display of computer aided design. The rapid readout and display system described by this invention provides a solution to the rapid display problem.

Figure 2:
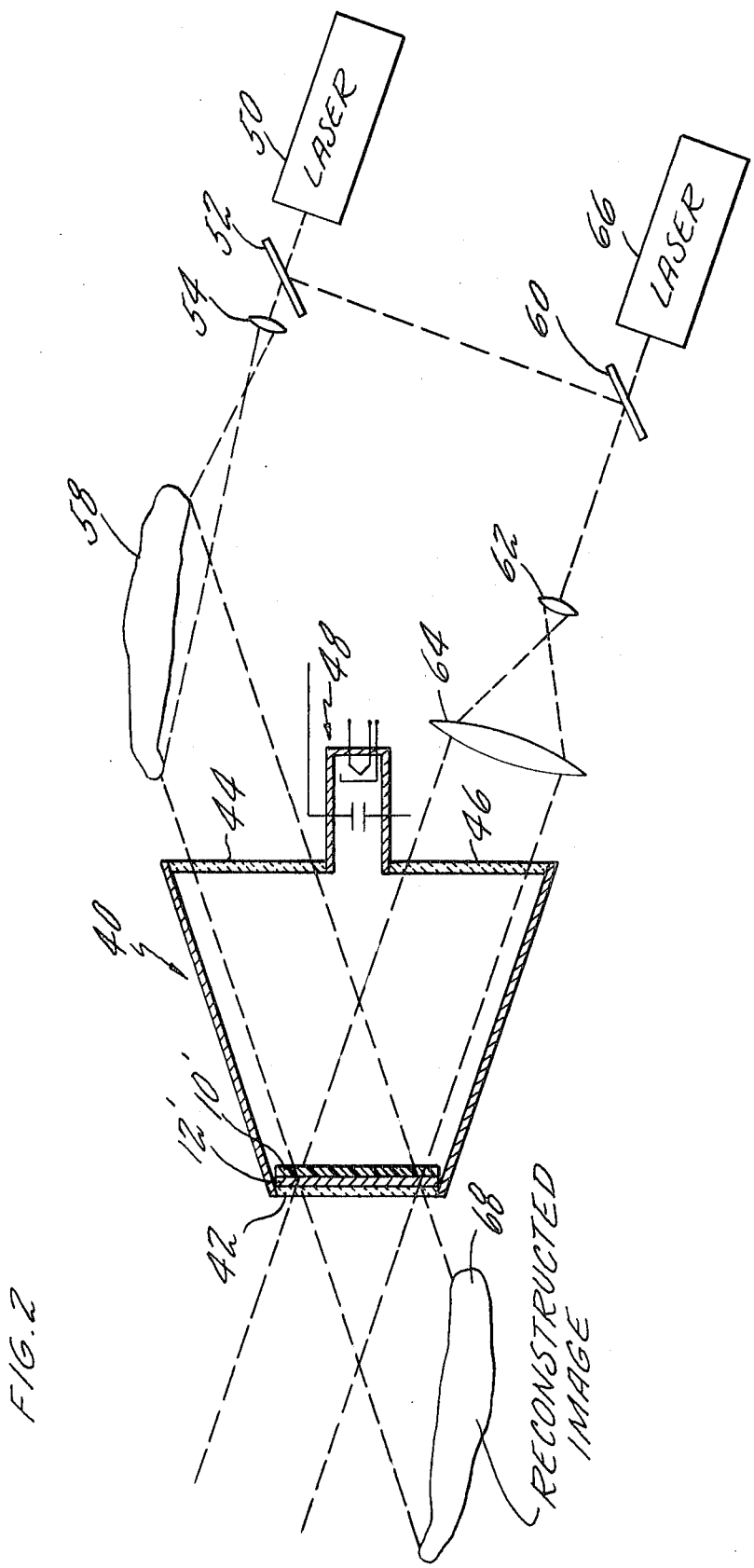
FIG. 2 shows schematically a three-dimensional imaging system in which a hologram is produced on a thermoplastic material by interaction between an electron charge and holographic information.

In FIG. 2 there is described a modification of the system of FIG. 1 in which the wave fronts from an actual object are impressed on the thermoplastic material. The electron tube 40 contains light transmitting windows 42, 44 and 46 and an electron gun structure 48 similar to that described with respect to FIG. 1. A thermoplastic material 10' which it associated transparent conducting electrode are contained within the electron tube 40.

In the embodiment of FIG. 2, the electron gun is programmed to produce a constant charge distrubution on the surface of thermoplastic material 10'. After the charge has been applied to the thermoplastic material, holographic information is then also impressed on the surface of the thermoplastic material. If the holographic information is produced by a laser in the infrared region, no additional source of heat is required, and the image produced by the infrared laser hologram will cause the variation in the thickness of the film in accordance with the distribution of the holographic information.

One method for producing the infrared holographic information is shown. A laser 50 which transmits in the infrared region produces a coherent output beam which passes through partially transmitting mirror 52 and expanding lens 54 to illuminate an object 58 of which it is desired to produce a hologram. As is known to those skilled in the holographic art, the wave fronts reflected from object 58 are then passed through window 44 to illuminate thermoplastic material 10'.

A portion of the light from infrared laser 50 is reflected from mirror 52 and impinges upon mirror 60, from which it is again reflected and passes through expanding lens 62, collimating lens 64 and window 46 to illuminate thermoplastic material 10'. This beam is the coherent reference beam which is required to produce the holographic image.

Coincidence of the image beam and the reference beam on thermoplastic material 10' will produce the holographic information in the form of interference fringes. Since the wavelength is in the infrared region, the thermoplastic material 10' will be heated according to the intensity distrubution of the holographic image, and the thermoplastic material will be deformed to produce the hologram.

Reproduction of the holographic image may be performed by a second laser 66, the wavelength of which is in the visible portion of the spectrum. The output from laser 66 will pass through partially transmitting mirror 60 and follow the path of the reference beam to illuminate the thermoplastic material 10'. Mirror 60 can be coated in such a way as to totally reflect light from laser 50 and transmit to a high degree light from lasser 66. The reconstructed three-dimensional image will appear as shown at 68.

As is known to those skilled in the art, the synthesis of the hologram or the coding of the experimental hologram must take into account the wavelength of the monochromatic light source used to reconstruct the three-dimensional image. In the FIG. 2 embodiment, the coherent light source used to produce the hologram will cause a magnification change when the image is reconstructed using visible light.

While the invention has been described for an off axis collimated light beam, and for the reconstruction of the real image by transmitted light, it will be apparent to those skilled in the art that by suitable modifications either uncollimated or collimated light, on or off axis reconstructions, real or virtual images, and transmitted or reflected holograms are possible and should be included within the scope of this invention.

Applications for the invention described herein are first, as a visual display for computer aided design programs; and second, in displays for training devices, aircraft blind landing systems, identification of targets and similar applications.

Other modifications of the present invention will be apparent to those skilled in the art, and the invention is not limited to the embodiments shown but to a novel method for producing a hologram utilizing a predetermined charge on a deformable material.

I claim:
1. A method for forming a three-dimensional image of an object comprising the steps of scanning a transparent, deformable thermoplastic material with an electron beam to produce an electric charge of constant magnitude on each incremental portion of said thermoplastic material, illuminating the object with a beam from a source of infrared coherent light whereby the wave fronts from said illuminated object also illuminate said thermoplastic material, simultaneously illuminating said thermoplastic material with a reference beam from said source of infrared coherent light wherein a diffraction pattern of infrared light is formed on said thermoplastic material and said thermoplastic material is deformed by said infrared light in accordance with said diffraction pattern, and illuminating said thermoplastic material with a beam of coherent visible light to form a three-dimensional image of said object.

* * * * *